United States Patent
Hager et al.

(10) Patent No.: US 10,247,380 B2
(45) Date of Patent: Apr. 2, 2019

(54) LUMINAIRE

(71) Applicant: OSRAM GmbH, Munich (DE)

(72) Inventors: Juergen Hager, Herbrechtingen (DE); Oliver Hering, Niederstotzingen (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 15/536,712

(22) PCT Filed: Dec. 10, 2015

(86) PCT No.: PCT/EP2015/079240
§ 371 (c)(1),
(2) Date: Jun. 16, 2017

(87) PCT Pub. No.: WO2016/096597
PCT Pub. Date: Jun. 23, 2016

(65) Prior Publication Data
US 2017/0350568 A1    Dec. 7, 2017

(30) Foreign Application Priority Data
Dec. 19, 2014   (DE) .................. 10 2014 226 650

(51) Int. Cl.
*F21S 41/24*     (2018.01)
*F21S 41/255*    (2018.01)
(Continued)

(52) U.S. Cl.
CPC ............ *F21S 41/24* (2018.01); *B60Q 1/0041* (2013.01); *F21K 9/61* (2016.08); *F21S 41/143* (2018.01);
(Continued)

(58) Field of Classification Search
CPC ........ F21S 41/24; F21S 41/335; F21S 41/285; F21S 41/192; F21S 43/14; F21S 41/143;
(Continued)

(56) References Cited

U.S. PATENT DOCUMENTS 6,611,382 B2 *   8/2003   Hashimoto ........ G02B 27/0961
                                                          359/619
6,789,929 B1     9/2004   Doong et al.
(Continued)

FOREIGN PATENT DOCUMENTS

DE         10065020 A1      3/2002
DE      102008021902 A1     11/2009
(Continued)

OTHER PUBLICATIONS

German Search Report based on application No. 10 2014 226 650.5 (8 pages) dated Nov. 23, 2015 (for reference purpose only).
(Continued)

*Primary Examiner* — Karabi Guharay
*Assistant Examiner* — Glenn D Zimmerman
(74) *Attorney, Agent, or Firm* — Viering, Jentschura & Partner MBB

(57) ABSTRACT

Disclosed is a lighting fixture comprising at least three light functions, said lighting fixture being a trifunctional projector. In particular, a vehicle headlight is disclosed, which has in addition to a dipped beam and a main beam a daytime running light and/or a position light as a further light function.

9 Claims, 4 Drawing Sheets

(51) Int. Cl.
*F21S 41/147* (2018.01)
*F21S 41/143* (2018.01)
*F21S 43/14* (2018.01)
*F21S 41/663* (2018.01)
*F21V 7/10* (2006.01)
*F21K 9/61* (2016.01)
*B60Q 1/00* (2006.01)
*F21S 41/33* (2018.01)
*F21S 41/19* (2018.01)
*F21S 41/20* (2018.01)
*F21Y 105/12* (2016.01)
*F21Y 105/18* (2016.01)
*F21Y 115/10* (2016.01)

(52) U.S. Cl.
CPC ........... *F21S 41/147* (2018.01); *F21S 41/192* (2018.01); *F21S 41/255* (2018.01); *F21S 41/285* (2018.01); *F21S 41/335* (2018.01); *F21S 41/663* (2018.01); *F21S 43/14* (2018.01); *F21V 7/10* (2013.01); *B60Q 2400/30* (2013.01); *F21Y 2105/12* (2016.08); *F21Y 2105/18* (2016.08); *F21Y 2115/10* (2016.08)

(58) Field of Classification Search
CPC ...... F21S 41/255; F21S 41/147; F21S 41/663; B60Q 1/0041; B60Q 2400/30; F21K 9/61; F21V 7/10; F21Y 2115/10; F21Y 2105/18; F21Y 2105/12

See application file for complete search history.

(56) References Cited

U.S. PATENT DOCUMENTS

| | | |
|---|---|---|
| 2004/0047161 A1 | 3/2004 | Mochizuki et al. |
| 2007/0183168 A1* | 8/2007 | Naganawa ............. B60Q 1/085 362/545 |
| 2009/0161338 A1 | 6/2009 | Teranishi et al. |
| 2013/0194816 A1 | 8/2013 | Hager et al. |
| 2013/0265793 A1 | 10/2013 | Helbig et al. |
| 2013/0272009 A1 | 10/2013 | Fujiu et al. |
| 2016/0109084 A1* | 4/2016 | Potter .................. F21S 41/663 362/511 |

FOREIGN PATENT DOCUMENTS

| | | |
|---|---|---|
| DE | 102010063713 A1 | 6/2012 |
| EP | 2568320 A2 | 3/2013 |
| WO | 2012038173 A1 | 3/2012 |

OTHER PUBLICATIONS

International Search Report based on application No. PCT/EP2015/079240 (14 pages) dated Feb. 5, 2016 (for reference purpose only).

* cited by examiner

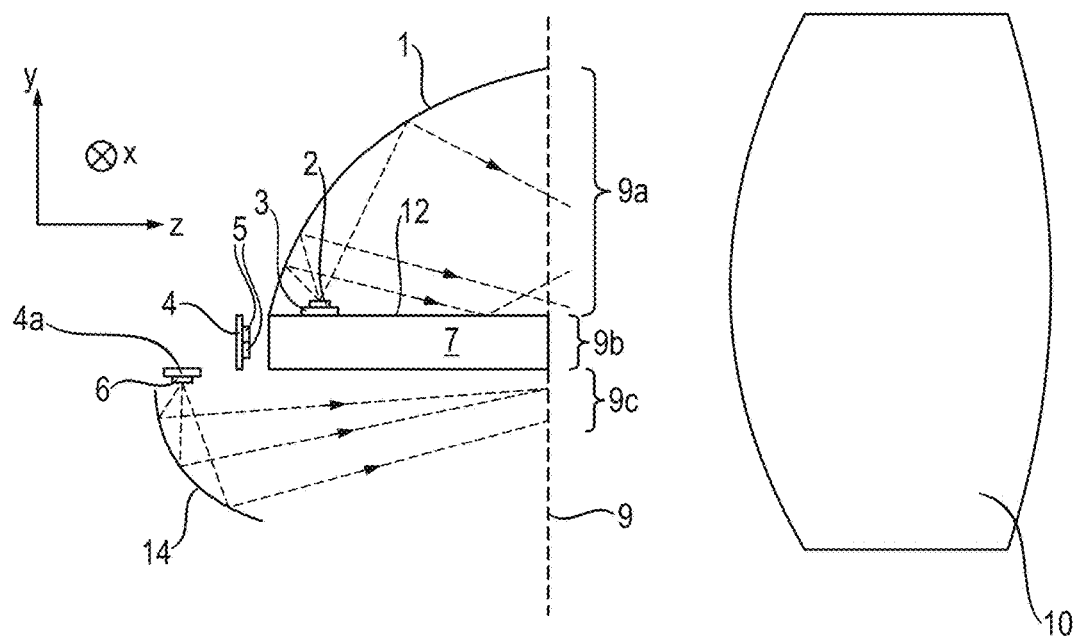
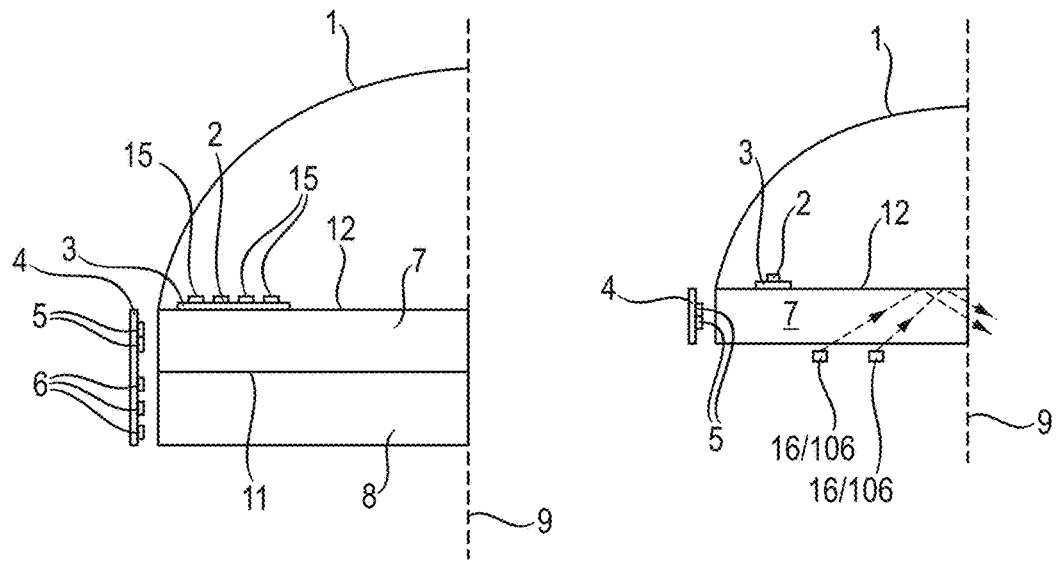
Fig. 11
Fig. 12
Fig. 13

LUMINAIRE

RELATED APPLICATIONS

The present application is a national stage entry according to 35 U.S.C. § 371 of PCT application No.: PCT/EP2015/079240 filed on Dec. 10, 2015, which claims priority from German application No.: 10 2014 226 650.5 filed on Dec. 19, 2014, and is incorporated herein by reference in its entirety.

TECHNICAL FIELD

The present disclosure is based on luminaires, in particular vehicle headlights, which have a plurality of functions.

BACKGROUND

Document WO 2012/038173 A1 discloses a luminaire which can provide two functions. To put it more precisely, a vehicle headlight is disclosed which can generate a low-beam light and a high-beam light. For generating the low-beam light, the vehicle headlight has a first group of semiconductor light sources, the light from which is directed in a conventional manner via a reflector to an optical intermediate plane. For generating the high-beam light, a second group of semiconductor light sources is provided, the light from which is guided via an optical waveguide to the same optical intermediate plane.

In order to separate the beam paths of the two groups of semiconductor light sources and thus in order to separate the light functions, a specularly reflective layer is applied on a side of the optical waveguide facing the reflector, said specularly reflective layer reflecting the light from the first group to the reflector. In the installed state of the vehicle headlight, the reflector is arranged above the optical waveguide and the specularly reflective surface is aligned approximately horizontally. The two groups of semiconductor light sources are secured on a common printed circuit board. If the latter is installed horizontally, the light from the second group has to be deflected to the optical intermediate plane. If the printed circuit board is installed vertically the light from the first group has to be deflected to the reflector.

SUMMARY

The object of the present disclosure is to provide a luminaire which has at least one third function. In particular, the object of the present disclosure is to develop the luminaire from WO 2012/038173 A1 in such a way that it has at least one third function besides the two functions mentioned.

This object is achieved by means of a luminaire having the features of patent claim 1.

Particularly advantageous configurations can be found in the dependent claims.

The claimed luminaire has at least one first light source, the light from which is substantially emitted to a reflector and is deflected by the latter to a first region of an optical intermediate plane. Furthermore, the luminaire has a second light source, the light from which is led or guided via an optical waveguide to a second region of the optical intermediate plane. A first and a second light function are thus made possible. The different light distributions are generated and formed in the optical intermediate plane. By virtue of the use of the optical waveguide, the boundaries of the second region which arise in the optical intermediate plane can be fashioned such that imaging problems, such as e.g. black lines of the lens, are minimized or eliminated. According to the present disclosure at least one further light source is provided, the light from which is likewise led or guided to the optical intermediate plane. Hence a third light function of the very compact luminaire is made possible and a compact trifunctional projector is thus realized.

In one particularly preferred configuration, the light of all the light functions is emitted from the optical intermediate plane substantially in a common direction.

In one particularly preferred application, the luminaire according to the present disclosure is a vehicle headlight, wherein a low-beam light is generated via the first light source and the reflector, and wherein a high-beam light is generated via the second light source and the optical waveguide. According to the present disclosure, a daytime running light or a position light is then generated via the further light source.

In accordance with a first basic variant of the luminaire according to the present disclosure, the light from the further light source is led or guided via the optical waveguide to the second region of the optical intermediate plane. The first variant of the luminaire is simple in terms of device technology.

In accordance with a second basic variant of the luminaire according to the present disclosure, the light from the further light source is led or guided via an optical component to a further region of the optical intermediate plane. The second variant of the luminaire offers an optically improved third light function which can be better adapted to the respective requirements.

The further region advantageously directly adjoins the second region. In this case, the further region can also adjoin the first region. The second region is then encompassed by the first region and by the third region.

In one particularly preferred development of both variants, a reflective coating is arranged, advantageously directly applied, on a top side of the optical waveguide facing the reflector. Hence the light from the first light source which impinges in particular on a rear region of the reflective coating in the beam direction is advantageously recycled by being reflected to the first region of the optical intermediate plane.

With the last-mentioned development, a horizontal shutter that is simple in terms of device technology is formed in the case of the vehicle headlight.

The first light source can be secured in a space-saving manner on a first printed circuit board which is arranged on the top side of the optical waveguide.

In addition to the first light source, an auxiliary light source can be secured on said first printed circuit board, the light from which auxiliary light source is likewise substantially emitted to the reflector and is deflected by the latter to the first region of the optical intermediate plane as a result of which a fourth light function is made possible.

If the luminaire according to the present disclosure is a vehicle headlight, the first light function of which is a low-beam light, wherein a position light is also intended to be generatable via the vehicle headlight, these two light functions are not permitted to be generated exclusively by the same first light source for technical reasons appertaining to safety. Therefore, in this case, it is particularly preferred if the position light is generated via the auxiliary light source of the vehicle headlight. It is then particularly preferred if the auxiliary light source is arranged close to the first light source. If the two light sources are formed by a respective group of individual light sources, the individual light sources can be arranged in a mixed fashion on the printed circuit board.

Advantageously, the luminaire according to the present disclosure has a secondary optical unit, in particular a lens or an axial arrangement of a plurality of lenses.

If the luminaire is a vehicle headlight, the secondary optical unit images the regions of the optical intermediate plane into the far field.

The second light source can be secured on a second printed circuit board, which is aligned approximately parallel to the optical intermediate plane, wherein the further light source is secured on a further printed circuit board which is aligned approximately perpendicularly to the second printed circuit board.

It is simpler in terms of device technology if the second light source and the further light source are secured jointly on a second printed circuit board aligned approximately parallel to the optical intermediate plane.

In accordance with a first preferred configuration of the optical component, the latter is a further optical waveguide. By virtue of the use of the further optical waveguide together with the first-mentioned optical waveguide, the boundaries of the assigned regions which arise in the optical intermediate plane can be fashioned such that imaging problems, such as e.g. black lines of the lens, are minimized or eliminated.

In this case, it is preferred if the two optical waveguides extend from the second printed circuit board to the optical intermediate plane. To put it more precisely, the two optical waveguides can extend from the respective light source to the optical intermediate plane. The respective light exit surfaces of the optical waveguides then form the respective regions of the optical intermediate plane.

In one advantageous configuration, a reflective coating is formed between the two optical waveguides. In order to produce said reflective coating, advantageously firstly the first optical waveguide is produced using injection-molding technology, said first optical waveguide being encapsulated with the second optical waveguide by injection molding after application of a reflective layer. By way of the shape of the boundary between the two optical waveguides and thus of the reflective coating it is possible to determine the extent of the second region and the extent of the further region.

In the case of the vehicle headlight, by way of the shape of the boundary between the two optical waveguides and thus of the reflective coating, it is possible to determine the extent of the high-beam light distribution and the extent of the daytime running light distribution.

Primary optical units can be assigned to the semiconductor light sources, via which primary optical units the light is concentrated, collimated, expanded or combined in particular before entering the optical waveguide(s).

In this regard, it is particularly preferred if a collimation lens is arranged between the first light source and the entrance surface of the assigned optical waveguide, wherein the optical waveguide extends from the collimation lens to the optical intermediate plane. The light is thus aligned (approximately) parallel ("collimated") before it enters the optical waveguide.

In accordance with a second preferred configuration of the optical component, the latter is a drum lens.

The collimation lens and the drum lens can then be produced as an integral injection-molded part in a simple manner in terms of device technology, wherein at least one web is provided between the collimation lens and the drum lens.

In accordance with a third preferred configuration of the optical component, the latter is a further reflector.

The light sources are advantageously semiconductor light sources, e.g. LEDs or laser diodes.

The light sources can be formed by groups of semiconductor light sources that are distributed in a matrixlike fashion on the printed circuit boards.

As already stated, in one particularly preferred application, the luminaire according to the present disclosure is a vehicle headlight in which the first light function is a low-beam light and the second light function is a high-beam light. The third light function can be a daytime running light or a position light. If the third light function is a daytime running light the fourth light function can be a position light.

A conversion dye for the high-beam light can be applied on the entrance surface or on an exit surface of the optical waveguide. The exit surface advantageously lies in the optical intermediate plane and forms the second region.

The printed circuit boards can be metal-core printed circuit boards or be produced from FR4.

The reflector or the reflectors is or are advantageously a half-shell reflector of half-shell reflectors.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 11 shows a sixth embodiment of a vehicle headlight according to the present disclosure in a lateral sectional illustration FIG. 12 shows an excerpt from a seventh embodiment of a vehicle headlight according to the present disclosure in a lateral sectional illustration FIG. 13 shows an excerpt from an eighth embodiment of a vehicle headlight according to the present disclosure in a lateral sectional illustration.

DETAILED DESCRIPTION

Figure 1:
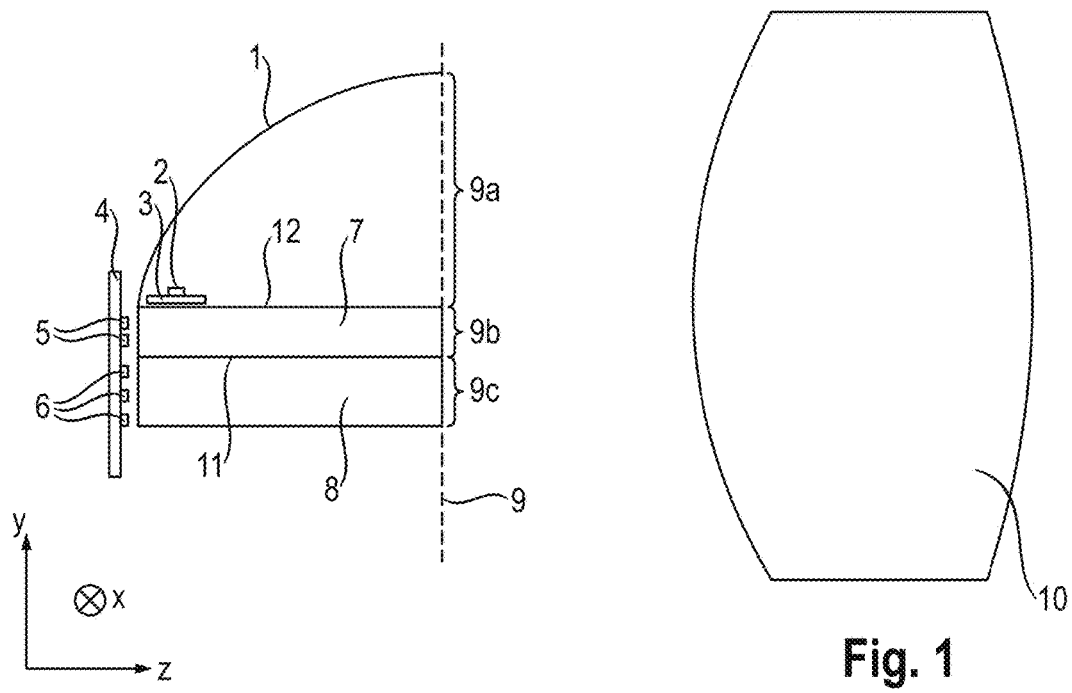
FIG. 1 shows a first embodiment of a vehicle headlight according to the present disclosure in a lateral sectional illustration

FIG. 1 shows a first embodiment of a vehicle headlight according to the present disclosure in a lateral sectional schematic illustration. Said vehicle headlight is installed in a vehicle (not shown in more specific detail), wherein z indicates the direction of travel of the vehicle.

A first light source 2 embodied as an LED is secured on a first printed circuit board 3 associated therewith and supplies an assigned half-shell reflector 1. The latter is responsible for the distribution of the light from the first light source 2 in a first region 9a of an optical intermediate plane 9 arranged perpendicularly to the direction z of travel. The distribution of the low-beam light is defined by the first region 9a. A lens 10 images the optical intermediate plane 9 into the far field (location of intermediate plane 9 is imaged at an angle).

Two second light sources 5 form a group and supply an optical waveguide 7, which distributes the light from the two second light sources 5 in a second region 9b of the intermediate plane 9. A high-beam light distribution on the optical intermediate plane 9 is optimized as a result. The second region 9b is also imaged via the lens 10. In order to better satisfy the stringent requirements of the illuminance in the case of the high-beam light distribution, laser diodes can be used as second light sources 5 and more than two second light sources 5 can be used. With the use of laser diodes, a conversion dye is applied on an entrance surface or on the exit surface that coincides with the second region 9b.

A plurality of further light sources 6, which jointly form a group, supply a further optical waveguide 8, which distributes the light from the further light sources 6 in a further region 9c of the optical intermediate plane and in this case is responsible for the daytime running light distribution. The further region 9c is also imaged via the lens 10.

In the same way as the group 5, the group 6 can consist of a plurality of LEDs or of a plurality of laser diodes.

The two optical waveguides 7, 8 extend approximately parallel to one another along the direction z of travel from a second printed circuit board 4, on which both groups of light sources 5, 6 are secured, as far as the optical intermediate plane 9.

By virtue of the use of the two optical waveguides 7, 8, boundaries between the different regions 9a, 9b, 9c of the optical intermediate plane 9 can be fashioned such that imaging problems (e.g. black lines) of the lens 10 are minimized or eliminated.

Generally, the second light sources 5 and the further light sources 6 can also be provided with primary optical units (not shown) which, depending on technical requirements appertaining to structural space and lighting, concentrate, collimate, expand or combine the light before the latter enters the respective optical waveguide 7, 8. In this case, the number, the form factor and the lateral arrangement of the light sources 5, 6 can be adapted as necessary to the light distribution.

The boundaries between the two optical waveguides 7, 8 and between the optical waveguide 7 and the half-shell reflector 1 must be fashioned so as to prevent crosstalk of the light into "extraneous optical regions". A reflective coating 12 is used for the boundary of the optical waveguide 7 facing the half-shell reflector 1. Hence the light from the first light sources 2 in the cavity of the half-shell reflector 1 is recycled since the light that impinges on the reflective coating 12 in the vicinity of the lens-side edge of the interface is reflected and is thus directed into the first region 9a.

Figure 2:
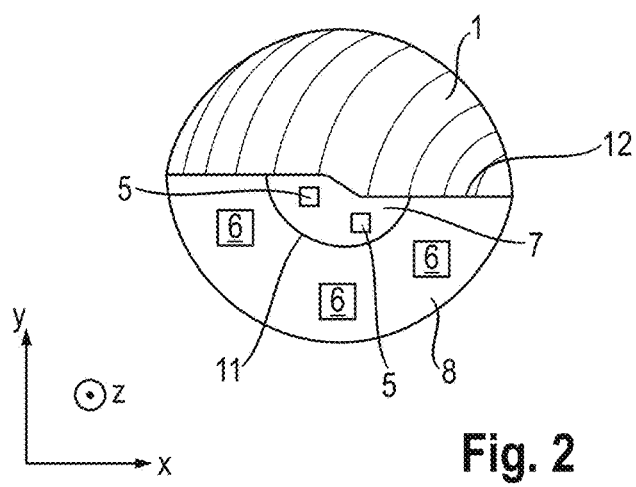
FIG. 2 shows the first embodiment in a sectional front view

FIG. 2 shows the first embodiment in accordance with FIG. 1 in a sectional front view, the viewing direction being directed counter to the direction z of travel. The half-shell reflector 1 is illustrated in the upper region. The optical waveguide 7 with the group of second light sources 5 situated behind it is illustrated in the lower region. The optical waveguide 7 is encompassed by the further optical waveguide 8 at its underside, the group of further light sources 6 being illustrated behind said further optical waveguide.

FIG. 2 illustrates in particular the regions where the two optical waveguides 7 and 8 bear against one another and the upper boundary of the two optical waveguides 7, 8. The reflective coatings are respectively provided there. To put it more precisely, the reflective coating 11 that is approximately semicircular in cross section can be discerned between the two optical waveguides 7, 8, while the reflective coating 12 can be discerned on the top sides of the two optical waveguides 7, 8. In order to produce the reflective coating 11, in terms of process engineering firstly the optical waveguide 7 is produced using injection molding technology and is encapsulated with the material of the further optical waveguide 8 by injection molding after the application of the corresponding reflective layer. By way of the shape of the boundary between the two optical waveguides 7, 8 and hence by way of the shape of the reflective coating 11 it is possible to control both the high-beam light distribution and the daytime running light distribution.

In a basic function of the vehicle headlight, the first light source 2 is activated. The low-beam light distribution is realized as a result. When the group of second light sources 5 is switched on, the high-beam light distribution is activated by virtue of the fact that the second region 9b of the high-beam light distribution is illuminated in addition to the illuminated first region 9a of the low-beam light distribution. In this case, the typical relative horizontal and/or vertical extent range (far field angle range) of the high-beam light distribution is not as extensive as that of the daytime running light distribution. As a result, the daytime running light function can be activated by switching on the group of further light sources 6.

Figure 3:
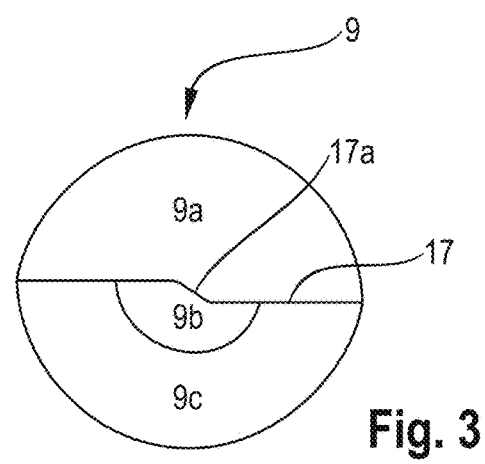
FIG. 3 shows an optical intermediate plane of the first embodiment

FIG. 3 shows the optical intermediate plane 9 of the first embodiment in accordance with FIGS. 1 and 2 in a view counter to the direction z of travel. In this case, the first region 9a of the daytime running light distribution is provided above a transverse line 17, while centrally the second region 9b of the high-beam light distribution and further out the further region 9c of the daytime running light distribution are provided below the transverse line 17. The transverse line 17 is bent twice as a result of which it has an oblique section 17a.

The further region 9c thus encompasses the horizontal and vertical regions of the daytime running light function that are not already covered via the second region 9b of the high-beam light function.

On account of the differences in brightness between the low-beam light and respectively high-beam light distribution and the daytime running light distribution, when the further light sources 6 are switched on, the first light source 2 and the second light sources 5 must simultaneously be dimmed, in order to coordinate the brightnesses of the different regions 9a, 9b and 9c with one another.

Figure 4:
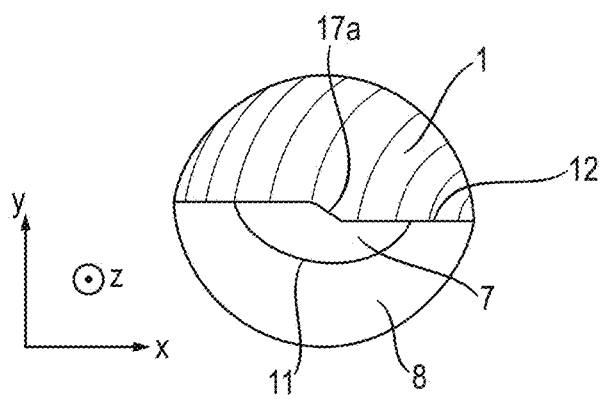
FIG. 4 shows a second embodiment of a vehicle headlight according to the present disclosure in a sectional front view

FIG. 4 shows a second embodiment of the vehicle headlight according to the present disclosure in a sectional front view. The essential difference with respect to the first embodiment in accordance with FIG. 2 can be seen in the fact that the optical waveguide 7 is widened horizontally that is to say in the transverse direction x, in comparison with the optical waveguide of the first embodiment.

Figure 5:
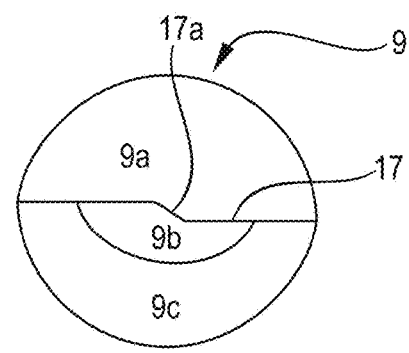
FIG. 5 shows the optical intermediate plane of the second embodiment

FIG. 5 shows the correspondingly horizontally widened second region 9b of the optical intermediate plane 9 and the consequently altered further region 9c.

In the case of the second embodiment in accordance with FIGS. 4 and 5, the high-beam light distribution is thus widened in comparison with the first embodiment.

Figure 6:
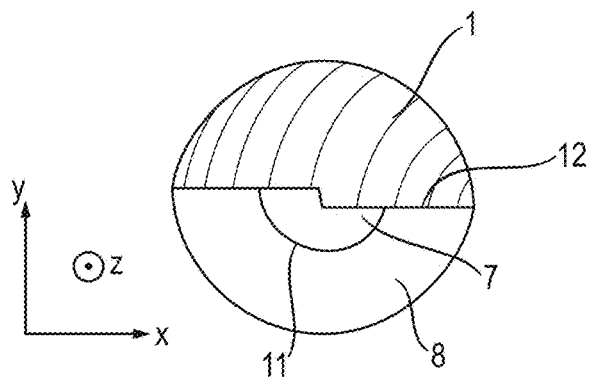
FIG. 6 shows a third embodiment of a vehicle headlight according to the present disclosure in a sectional front view
Figure 7:
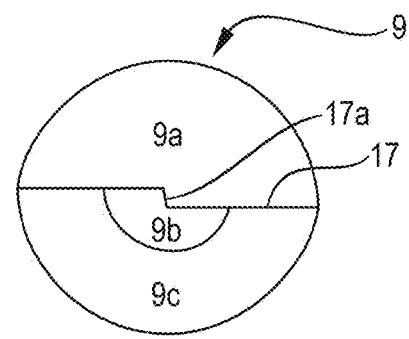
FIG. 7 shows the optical intermediate plane of the third embodiment

FIGS. 6 and 7 show a sectional front view and respectively the optical intermediate plane 9 of a third embodiment of the vehicle headlight according to the present disclosure. In this case, the dimensions of the two optical waveguides 7, 8 and of the two regions 9b, 9c in a vertical direction y were reduced in comparison with the first embodiment. Hence the ratios of the respective vertical dimensions to the horizontal dimensions are reduced in the case of the high-beam light distribution and daytime running light distribution.

Furthermore, the gradient of the oblique section 17a of the reflective coating 12 or of the transverse line 17 was increased. Consequently, the shape of the bright-dark boundary of the low-beam light on the road was altered in comparison with the two previous embodiments. This is e.g. necessary or possible with the different variants of ECE-R 112 or of the FMVSS or SAE regulations that are typical in the USA.

Figure 8:
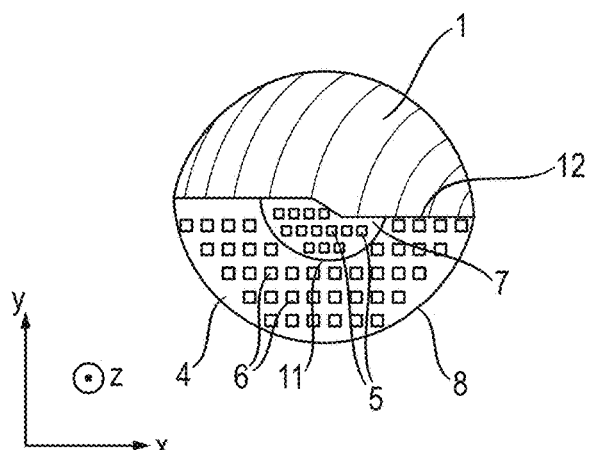
FIG. 8 shows a fourth embodiment of a vehicle headlight according to the present disclosure in a sectional front view

FIG. 8 shows a fourth embodiment of the vehicle headlight according to the present disclosure in a sectional front view. In this case, the essential difference with respect to the first embodiment in accordance with FIG. 2 can be seen in the fact that a multiplicity of second light sources 5 and a multiplicity of further light sources 6 are distributed in a matrixlike fashion on the second printed circuit board 4. In the embodiment shown, the distribution is regular. In a departure therefrom, the light sources 5, 6 can also be distributed irregularly. An improved illumination of the second region 9b and of the further region 9c (not shown in FIG. 8) can be achieved in both cases. By means of different switching states of the individual light sources 5, 6, it is possible as necessary to compensate for inhomogeneities or to generate them in a targeted manner.

Figure 9:
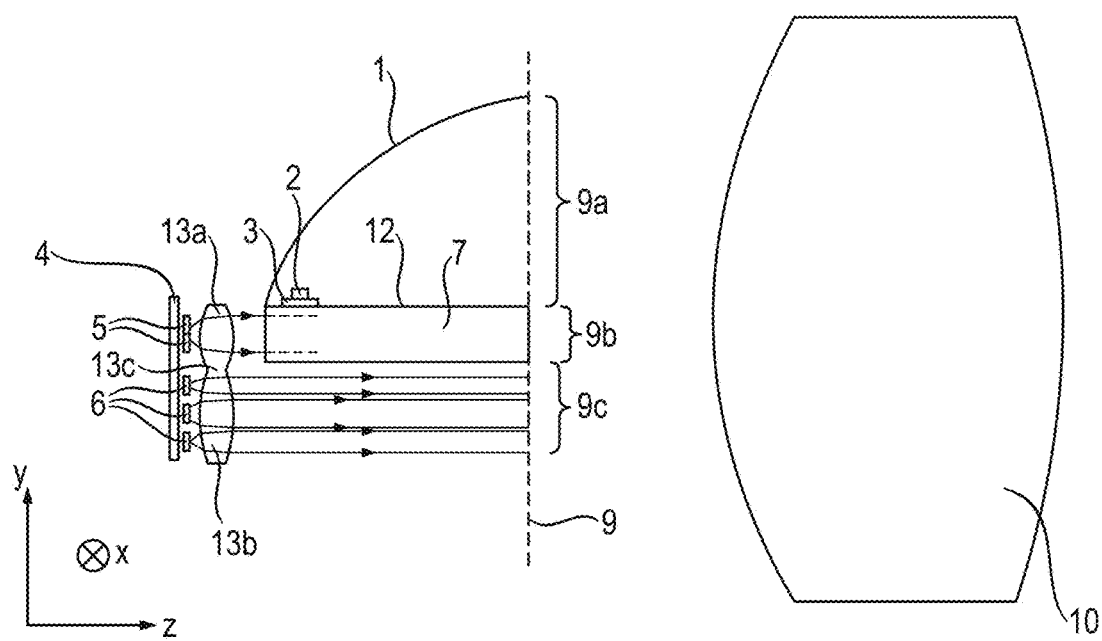
FIG. 9 shows a fifth embodiment of a vehicle headlight according to the present disclosure in a lateral sectional illustration

FIG. 9 shows a fifth embodiment of the vehicle headlight according to the present disclosure in a lateral sectional illustration. In this case, the essential difference with respect to the first embodiment in accordance with FIG. 1 can be seen in the fact that a drum lens 13b (as optical component) is provided instead of the further optical waveguide 8. The light from the group of further light sources 6 is aligned parallel via the drum lens 13b and directed into the further region 9c. Furthermore, a collimation lens 13a is embodied integrally with the drum lens 13b which collimation lens aligns the light from the second light sources 5 parallel before said light enters the optical waveguide 7.

Figure 10:
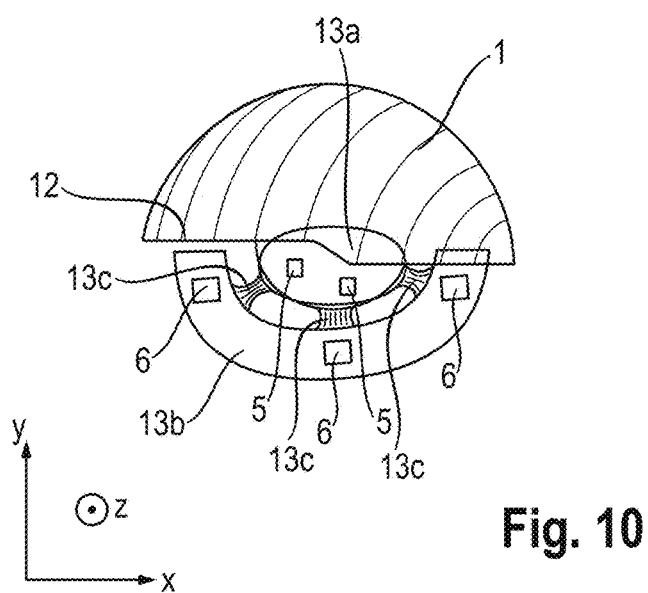
FIG. 10 shows the fifth embodiment in a sectional front view

FIG. 10 shows the fifth embodiment in accordance with FIG. 9 in a sectional front view. It can be discerned here that the drum lens 13b and the collimation lens 13a are connected to one another via three webs 13c. The two lenses 13a, 13b connected via the webs 13c are produced as an integral plastics injection-molded part.

The distribution of the second light sources 5 and of the further light sources 6 on the common printed circuit board 4 corresponds to that of the first embodiment in accordance with FIG. 2.

FIG. 11 shows a sixth embodiment of the vehicle headlight according to the present disclosure in a lateral sectional illustration. In this case, the essential difference with respect to the previous embodiments can be seen in the fact that the optical component in the beam path between the further light sources 6 and the further region 9c is a further half-shell reflector 14. In this case, the further light sources 6 are secured on a further printed circuit board 4a which is installed horizontally. The further light sources 6 emit their light substantially downward (counter to the vertical direction y). The further half-shell reflector 14 is arranged below the further light sources 6 and deflects the light approximately in the direction z of travel. As already explained, the first region 9a, the second region 9b and the further region 9c of the optical intermediate plane 9 are imaged via the lens 10 in the direction z of travel.

It is known from the prior art to achieve the position light distribution by dimming the daytime running light distribution since their relative light distributions are similar. However, this is not possible for the first region 9a since the latter is supplied by the first light source 2 which generates the low-beam light. However, the position light is not permitted to be exclusively served by the light source 2 of the low-beam light for technical reasons appertaining to safety.

FIG. 12 shows a seventh embodiment of the vehicle headlight according to the present disclosure in a lateral sectional illustration, the lens 10 not being illustrated. The exemplary embodiment is comparable, in principle with the first embodiment in accordance with FIG. 1. In a departure, at least one or a plurality of auxiliary light source(s) 15 is/are secured on the first printed circuit board 3, such that said auxiliary light source(s) together with the first light source 2 emit in the half-shell reflector 1. Thus, in addition to the three light functions of low-beam light, high-beam light and daytime running light already explained, it is also possible to operate the light function of position light in a permissible manner.

The at least one auxiliary light source 15 is or these are positioned as near as possible to the first light sources 2, such that by means of the lateral position variation and off-focus effects the light distribution in the first region 9a is filled such that together with the second light sources 5 and the further light sources 6 an optimum position light distribution can be achieved.

FIG. 13 shows an eighth embodiment of the vehicle headlight according to the present disclosure in a lateral sectional illustration, once again the lens 10 not being illustrated. Furthermore, the components necessary for the daytime running light are not illustrated. These correspond either to the fifth embodiment in accordance with FIG. 9 or to the sixth embodiment in accordance with FIG. 11, since structural space for additional light sources 16 is required on the underside of the optical waveguide 7. Said additional light sources radiate laterally into the optical waveguide 7 and can be switched on in order to better fill the second region 9b and to support the second light sources 5 with regard to brightness. The high-beam light of the vehicle headlight according to the present disclosure is thus improved.

Furthermore, a variant of the vehicle headlight according to the present disclosure that deviates in principle from the previous embodiments is explained with reference to FIG. 13. In this variant, the light function of daytime running light and possibly additionally the light function of position light are made possible via further light sources 106 wherein the further light sources 6 and the optical components 8, 13b and/or 14 of the previous embodiments are omitted. This variant is advantageous if, for technical reasons, it is not possible to correspondingly dim the second light source 5 for the daytime running light and possibly the position light. The daytime running light and possibly the position light can then be undertaken completely by the further light sources 106 which can be better adapted to the requirements of these functions on account of their brightness and efficiency.

All the embodiments exhibit a very compact design and in some instances multiple use of identical light sources for a plurality of light functions of the vehicle headlight according to the present disclosure. Said light functions are low-beam light, high-beam light, daytime running light and, in subvariants, also position light. By virtue of the use of the optical waveguide 7 as a central element, the dark stripes or regions in the light distribution that otherwise occur and are imaged by the lens 10 are reduced or avoided.

The second light sources 5 and third light sources 6 and their associated optical waveguides 7 and 8 can also be jointly rotatable relative to the reflector 1 and the light sources thereof about the y-axis. This can take place statically, that is to say that the rotation is planned to be fixedly included in the light distribution. As a result, e.g. the horizontal illumination of the road can be designed differently for the right and left headlights. Alternatively, the rotation can also take place dynamically, in order for example to enable better illumination when cornering. Moreover, it is possible for example, to generate a type of simple dazzle-free high-beam light by means of the independent control of the rotation for different modules.

Advantageously, the at least one semiconductor light source includes at least one light emitting diode. If a plurality of light emitting diodes are present, they can emit light in the same color or in different colors. A color can be monochromatic (e.g. red, green, blue, etc.) or multichromatic (e.g. white). Moreover the light emitted by the at least one light emitting diode can be an infrared light (IR LED) or an ultraviolet light (UV LED). A plurality of light emitting diodes can generate a mixed light; e.g. a white mixed light. The at least one light emitting diode can contain at least one wavelength-converting phosphor (conversion LED). The phosphor can alternatively or additionally be arranged remote from the light emitting diode ("remote phosphor"). The at least one light emitting diode can be present in the form of at least one individually packaged light emitting diode or in the form at least one LED chip. A plurality of LED chips can be mounted on a common substrate ("submount"). The at least one light emitting diode can be equipped with at least one dedicated and/or common optical unit for beam guiding, e.g. at least one Fresnel lens, collimator, and so on. Instead of or in addition to inorganic light emitting diodes, e.g. on the basis of InGaN or AlInGaP, generally organic LEDs (OLEDs, e.g. polymer OLEDs) can also be used. Alternatively, the at least one semiconductor light source may include e.g. at least one diode laser.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A luminaire comprising:
    at least one first light source, the light from which is substantially emittable to a reflector and is deflectable by the latter to an optical intermediate plane as a result of which a first light function is realized;
    a second light source, the light from which is guidable via an optical waveguide to the optical intermediate plane as a result of which a second light function is realized;
    a further light source, the light from which is guidable via a drum lens to the optical intermediate plane as a result of which a third light function is realized; and
    a collimation lens connected with the drum lens via at least one web provided between the collimation lens and the drum lens.

2. The luminaire as claimed in claim 1, wherein the light from the further light source is guidable via the optical waveguide to the optical intermediate plane.

3. The luminaire as claimed in claim 1, wherein a reflective coating is arranged on a side of the optical waveguide facing the reflector.

4. The luminaire as claimed in claim 1, wherein the first light source is secured on a first printed circuit board, which is arranged on a side of the optical waveguide facing the reflector.

5. The luminaire as claimed in claim 1, wherein the second light source and the further light source are secured on a second printed circuit board, which is aligned approximately parallel to the optical intermediate plane.

6. The luminaire as claimed in claim 1, wherein the collimation lens is arranged between the first light source and the optical waveguide, and wherein the optical waveguide extends from the collimation lens to the optical intermediate plane.

7. The luminaire as claimed in claim 1, wherein the luminaire is a vehicle headlight, the first light function of which is a low-beam light, and the second light function of which is a high-beam light, and the third light function of which is a daytime running light or a position light.

8. The luminaire as claimed in claim 4, wherein an auxiliary light source is secured on the first printed circuit board, the light from which auxiliary light source is substantially emittable to the reflector and is deflectable by the latter to the optical intermediate plane as a result of which a fourth light function is realized.

9. The luminaire as claimed in claim 8, wherein the luminaire is a vehicle headlight, the first light function of which is a low-beam light, and the second light function of which is a high-beam light, and the third light function of which is a daytime running light, and the fourth light function of which is a position light.

* * * * *